US010655682B2

(12) United States Patent
Bellacci et al.

(10) Patent No.: US 10,655,682 B2
(45) Date of Patent: May 19, 2020

(54) BEARING SYSTEM WITH A ROTARY BUSH AND TURBOMACHINE

(71) Applicant: NUOVO PIGNONE TECNOLOGIE, SRL, Florence (IT)

(72) Inventors: Michelangelo Bellacci, Florence (IT); Daniele Panara, Florence (IT); Marco Magnasco, Sarzana (IT); Pierluigi Tozzi, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

(21) Appl. No.: 15/853,686

(22) Filed: Dec. 22, 2017

(65) Prior Publication Data

US 2018/0180098 A1    Jun. 28, 2018

(30) Foreign Application Priority Data

Dec. 22, 2016   (IT) .......................... 102016000130216

(51) Int. Cl.
*F16C 37/00*     (2006.01)
*F04D 29/057*    (2006.01)
*F16C 33/20*     (2006.01)

(52) U.S. Cl.
CPC .......... *F16C 37/002* (2013.01); *F16C 33/206* (2013.01); *F04D 29/057* (2013.01); *F16C 2208/32* (2013.01); *F16C 2208/36* (2013.01); *F16C 2360/23* (2013.01); *F16C 2360/44* (2013.01)

(58) Field of Classification Search
CPC ................ F16C 17/243; F16C 33/1025; F16C 33/1045; F16C 33/1055; F16C 33/1085; F16C 33/206; F16C 37/002

USPC ................... 384/278, 313, 316, 317, 321
See application file for complete search history.

(56) References Cited

U.S. PATENT DOCUMENTS

| 4,053,277 | A  | * | 10/1977 | Bos ................. D02J 13/005 |
|           |    |   |         |                         384/109 |
| 4,896,975 | A  |   | 1/1990  | Bescoby |
| 6,353,272 | B1 |   | 3/2002  | van der Hoeven |
| 7,687,951 | B2 | * | 3/2010  | Komori ................ F16C 17/026 |
|           |    |   |         |                         310/90 |
| 2016/0084301 | A1 | | 3/2016 | Baldassarre |

FOREIGN PATENT DOCUMENTS

| JP | 2005163641 A   | 6/2005  |
| WO | 2013190463 A1  | 12/2013 |
| WO | 2015/002924 A1 | 1/2015  |

OTHER PUBLICATIONS

Panara, D., et al., Method for uniforming temperature in a shaft supported by a fluid bearing, bearing system and turbomachine, GE Co-Pending Application No. IT102015000055511, filed on Sep. 25, 2015.
Italian Search Report dated Aug. 29, 2017 in correspondence with IT Application No. 201600130216, filed on Dec. 22, 2016.

* cited by examiner

*Primary Examiner* — James Pilkington
(74) *Attorney, Agent, or Firm* — Baker Hughes Patent Organization

(57) ABSTRACT

The bearing system includes a fluid bearing, a shaft with a solid portion, and a bush located around the solid portion and in front of pad or pads of the fluid bearing; the bush includes a hollow portion and a plurality of supporting elements that fix the hollow portion of the bush to the solid portion of the shaft.

9 Claims, 7 Drawing Sheets

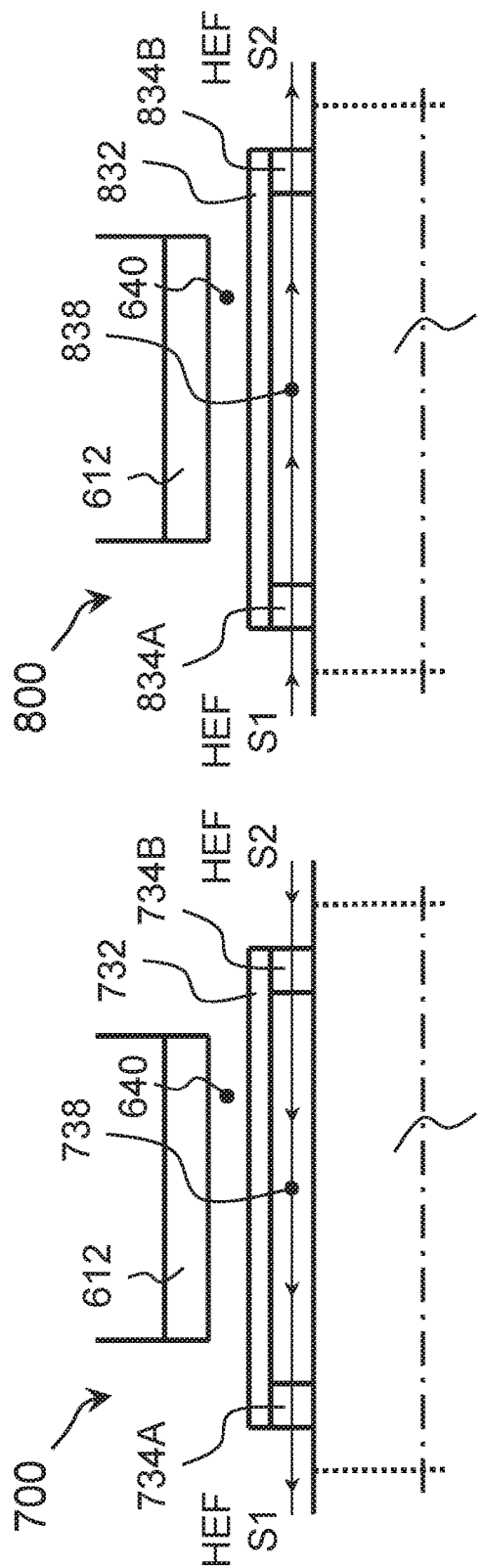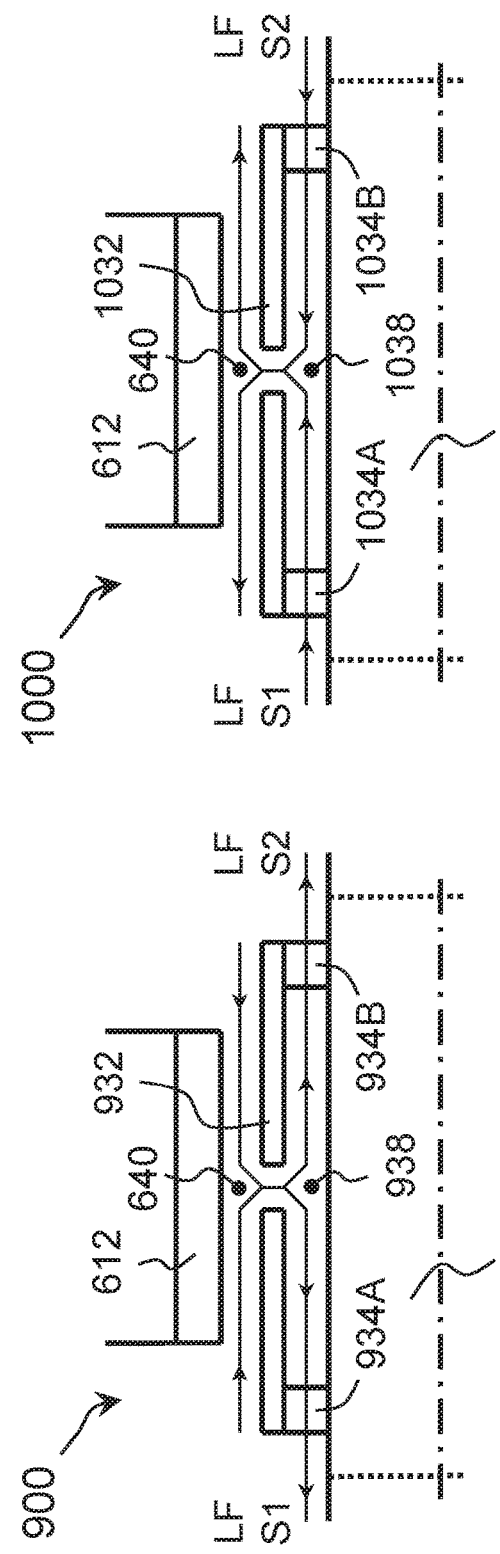

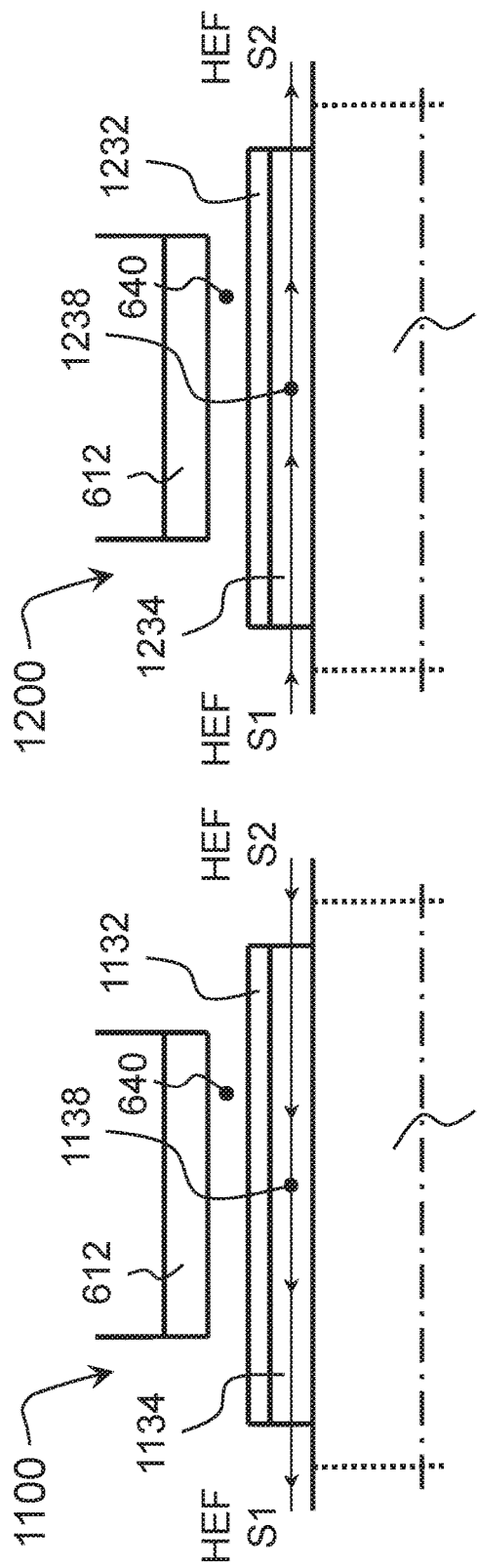
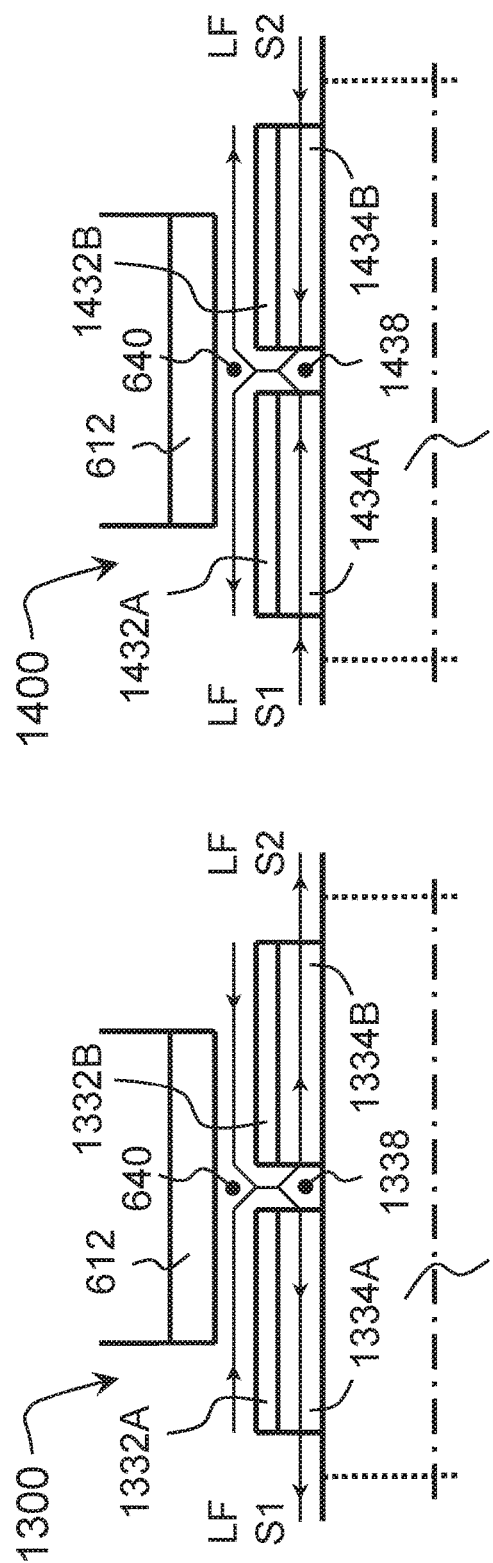

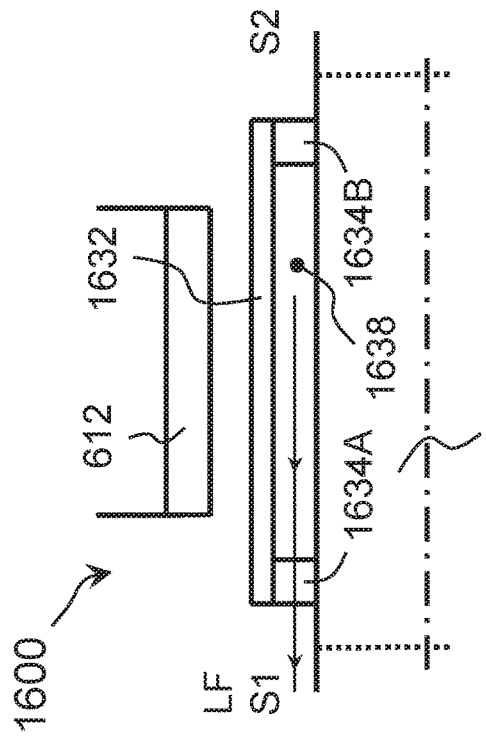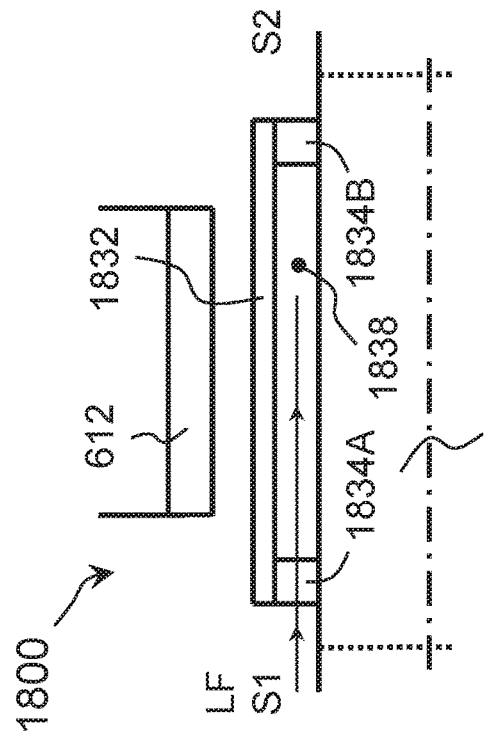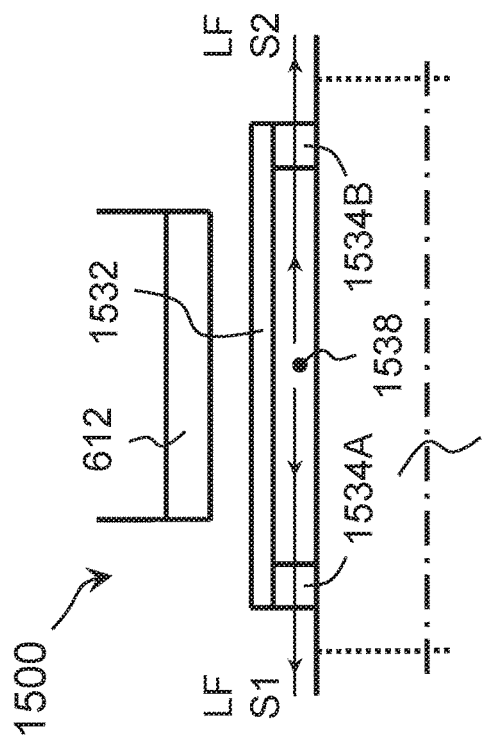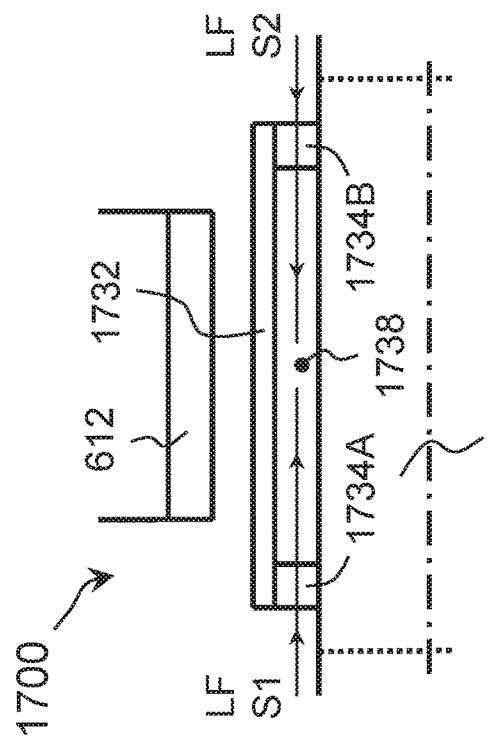

BEARING SYSTEM WITH A ROTARY BUSH AND TURBOMACHINE

TECHNICAL FIELD

Embodiments of the subject matter disclosed herein correspond to methods for uniforming temperature in a shaft supported by a fluid bearing, bearing systems and turbomachines.

BACKGROUND OF THE INVENTION

The rotor of a rotary machine is rotatably supported by specific devices; in particular, the shaft of the machine is supported by one or more bearings.

FIG. 1 schematically shows a turbomachine 100 comprising a stator 110 and a rotor 120. For example, the rotor 120 has a rotary shaft with a first shaft end-portion 121 protruding from a first side and a second shaft end-portion 122 protruding from a second side, and the stator 110 has a first fluid bearing 111 rotatably supporting the first shaft end-portion 121 and second fluid bearing 112 rotatably supporting the second shaft end-portion 122.

There are several types of "fluid bearings" (also known as "fluid-film bearings" that can be broadly classified into two types: "fluid dynamic bearings" and "hydrostatic bearings"): plain bearings, lemon bearings, tilting-pads bearings, etc.

FIG. 2 schematically shows a plain fluid bearing system 200 according to the prior art. It comprises a rotary shaft 210 (partially shown in FIG. 2) with a journal 211 (corresponding to an axial portion of the shaft that is delimited by two dotted lines in FIG. 2), and a plain fluid bearing 220; the journal 211 is located inside the bearing 220. The bearing 220 has a cylindrical bearing statory pad 221 (such "pad" is often called "bush" due to its cylindrical shape) around the rotary journal 211, and there is a small gap between the pad 221 and the journal 211 around the journal 211. During rotation of the shaft 210, a lubricant fluid LF is injected between the pad 221 and the journal 211 so to avoid contact and reduce friction; the lubricant fluid LF typically flows from the middle (sometimes the center as in FIG. 2) of the pad 221 to the two sides of the bearing 220.

FIG. 2 shows a theoretical (that may be considered ideal) situation wherein the axis of the shaft 210 and the axis 230 of the journal seat of the bearing 220 coincide; in this case, the gap between the pad 221 and the journal 211 is uniform all around the journal 211.

Anyway, in a rotary machine during rotation of the shaft 210, the two axes do not coincide: they may be distant and/or inclined between each other.

By way of example, FIG. 3 shows four successive positions of the journal 211 inside the pad 221 as the shaft 210 rotates about its axis; the journal 211 makes a rotation movement about its axis and an orbital movement about the axis 230 of the bearing; starting from the position in FIG. 3A, the journal makes a rotation movement of 90° clockwise and an orbital movement of 90° clockwise and reaches the position of FIG. 3B, then the journal makes a rotation movement of 90° clockwise and an orbital movement of 90° clockwise and reaches the position of FIG. 3C, then the journal makes a rotation movement of 90° clockwise and an orbital movement of 90° clockwise and reaches the position of FIG. 3D.

In this case, the gap between the pad 221 and the journal 211 is non-uniform; in particular, if a point A on a diameter D of the journal 211 is considered, the distance between the point A and the pad 221 remains the same (or does not change much) at any time; this means that the temperature of the journal in the region of point A will be higher than the temperature in e.g. an opposite region of the journal.

FIG. 4 shows an exemplary simplified temperature plot along diameter D of the journal 211: at a first end E1 (close to point A) of the diameter D there is a high temperature T1, at a second end E2 (remote from point A) of the diameter D there is a low temperature T2; this temperature plot is a perfectly straight segment; more realistically, the temperature plot is a slightly curved segment. Such non-uniform temperature distribution inside the journal causes bending of the shaft at the journal and synchronous rotor vibrations, i.e. the so-called "Morton Effect"; under certain conditions, especially in high-speed turbomachines, it can lead to synchronous rotor instability.

In order to overcome such problem, document WO2015002924A1 teaches to arrange a tubular body around the shaft at the journal; the tubular body comprises a thermal barrier that absorbs at least a portion of heat generated by the rotation of the shaft. In this way, non-uniformity reduction depends on the width and the material of the thermal barrier.

SUMMARY OF INVENTION

Therefore, there is a general need for avoiding non-uniform temperature distribution inside a shaft journal supported by a fluid bearing, or at least reducing non-uniformity considerably.

This need is particularly high for turbomachines such as those used in the field of "Oil & Gas", i.e. machines used in plants for exploration, production, storage, refinement and distribution of oil and/or gas.

It is to be noted that a non-uniform temperature distribution like the one shown in FIG. 5, does not cause bending of the shaft at the journal and synchronous rotor vibrations; this temperature plot along diameter D is symmetric with respect to the axis of the journal (for example, the temperatures at the first end E1 and at the second end E2 are equal to T4 and the temperature T5 at the axis is slightly lower than the temperature T4); this temperature plot is exaggerated as, more realistically, it should be a slightly curved segment.

First embodiments of the subject matter disclosed herein relate to a bearing system.

According to such first embodiments, the bearing system comprises a fluid bearing, a shaft with a solid cylindrical portion, that may be called "shaft journal", and a bush located around said solid cylindrical portion and in front of pad or pads of the fluid bearing; the bush comprises a hollow cylindrical portion and a plurality of supporting elements that fix the hollow cylindrical portion of the bush to the solid cylindrical portion of the shaft.

Such bush not only provides thermal insulation to the shaft journal but also allows to transfer heat from parts of the region of the shaft journal subject to high heating to other parts of the region of the shaft journal subject to lower heating. In this way, a uniform temperature may be achieved at least in a radially peripheral region of the shaft journal.

Second embodiments of the subject matter disclosed herein relate to a turbomachine.

According to such second embodiments, the turbomachine comprises at least one bearing system; the bearing system comprises a fluid bearing, a shaft with a solid cylindrical portion, and a bush located around said solid cylindrical portion and in front of pad or pads of the fluid bearing; the bush comprises a hollow cylindrical portion and a plurality of supporting elements that fix the hollow cylindrical portion of the bush to the solid cylindrical portion of the shaft.

BRIEF DESCRIPTION OF DRAWINGS

The accompanying drawings, which are incorporated herein and constitute an integral part of the present specification, illustrate exemplary embodiments of the present invention and, together with the detailed description, explain these embodiments. In the drawings:

FIG. 7 shows, partially and schematically, a first embodiment of a bearing system,
FIG. 8 shows, partially and schematically, a second embodiment of a bearing system,
FIG. 9 shows, partially and schematically, a third embodiment of a bearing system,
FIG. 10 shows, partially and schematically, a fourth embodiment of a bearing system,
FIG. 11 shows, partially and schematically, a fifth embodiment of a bearing system,
FIG. 12 shows, partially and schematically, a sixth embodiment of a bearing system,
FIG. 13 shows, partially and schematically, a seventh embodiment of a bearing system,
FIG. 14 shows, partially and schematically, an eighth embodiment of a bearing system,
FIG. 15 shows, partially and schematically, a ninth embodiment of a bearing system,
FIG. 16 shows, partially and schematically, a tenth embodiment of a bearing system,
FIG. 17 shows, partially and schematically, an eleventh embodiment of a bearing system,
and FIG. 18 shows, partially and schematically, a twelfth embodiment of a bearing system.

DETAILED DESCRIPTION

The following description of exemplary embodiments refers to the accompanying drawings.

The following description does not limit embodiments of the present invention. Instead, the scope of embodiments of the present invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
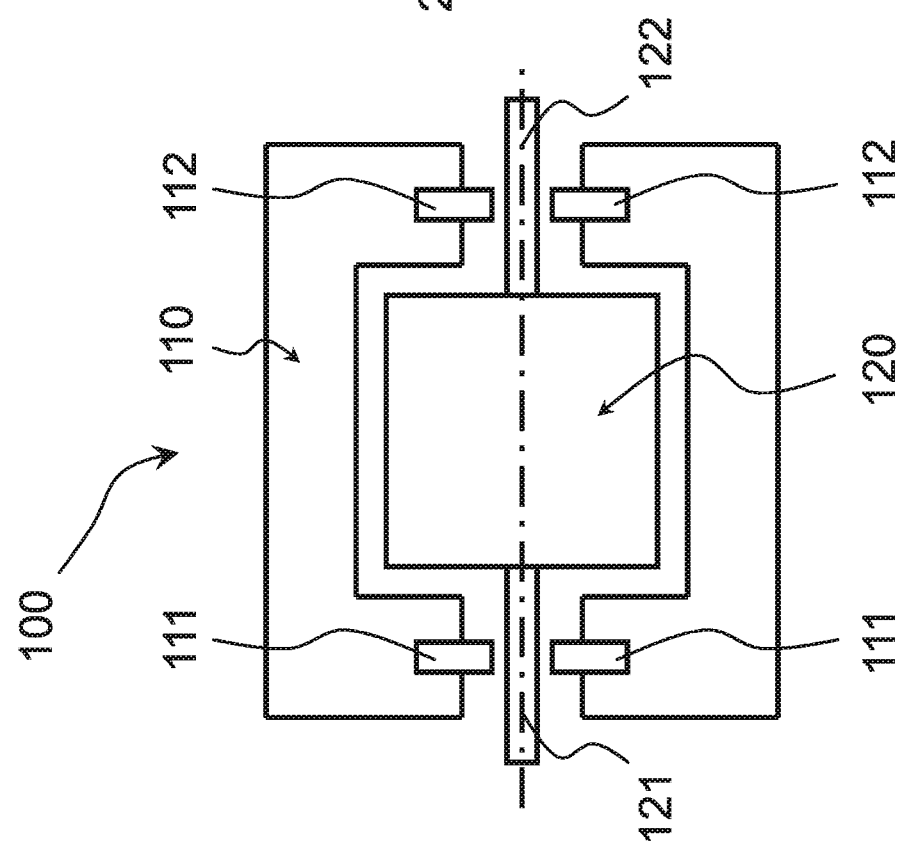
FIG. 2 shows schematically a bearing system according to the prior art.
Figure 3A:
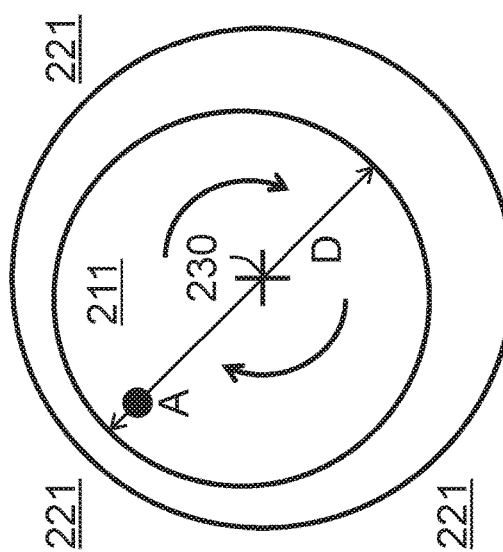
FIGS. 3A, 3B, 3C and 3D show positions of the shaft journal inside the bearing pad in the bearing system of FIG. 2.
Figure 3B:
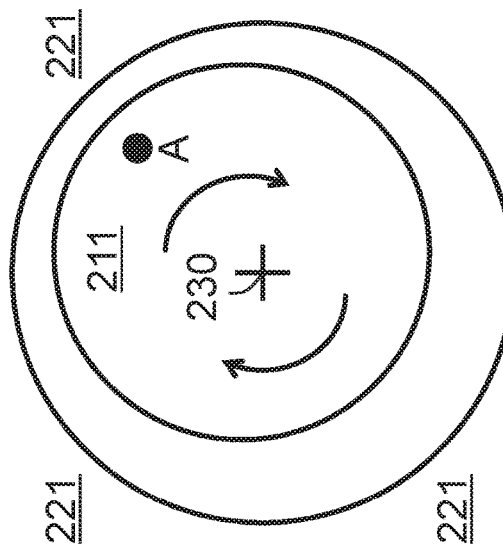
Figure 3C:
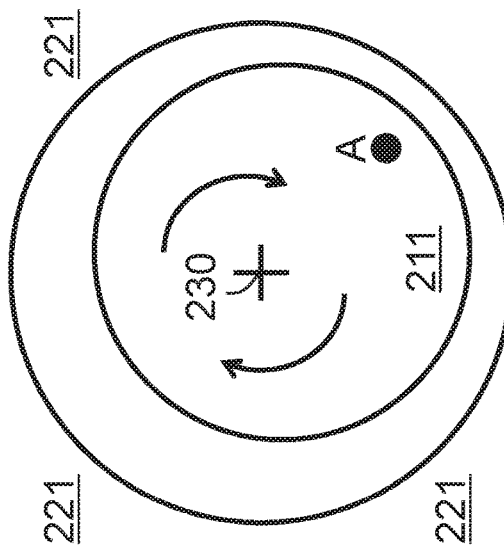
Figure 3D:
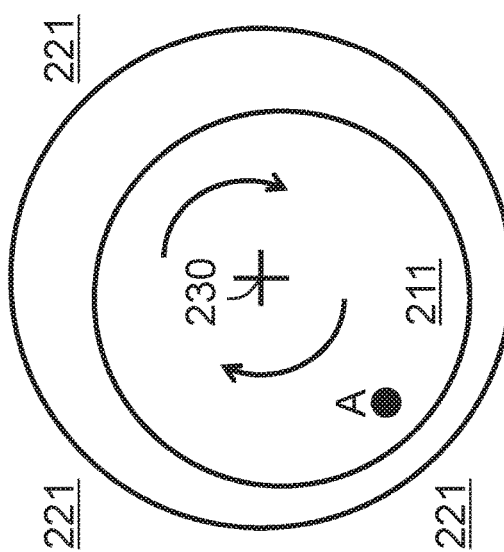
Figure 5:
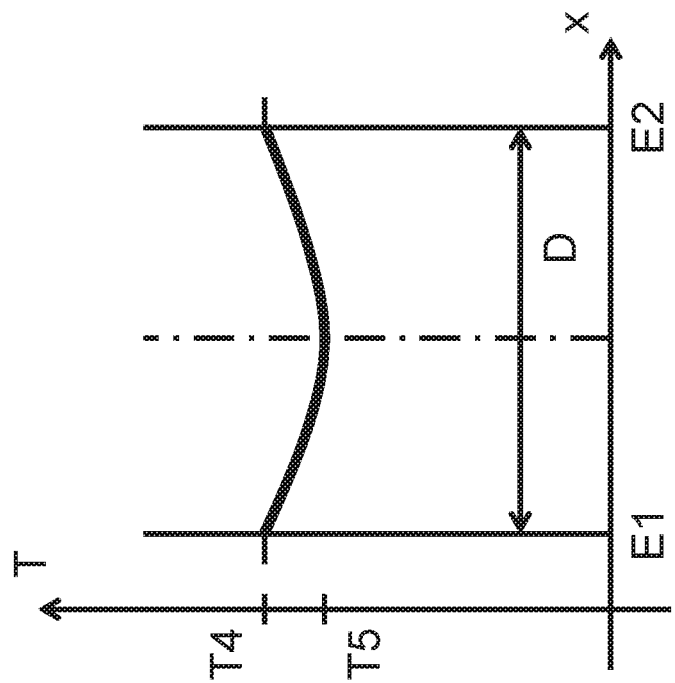
FIG. 5 shows an exemplary (exaggerated) temperature plot inside a shaft journal.
Figure 4:
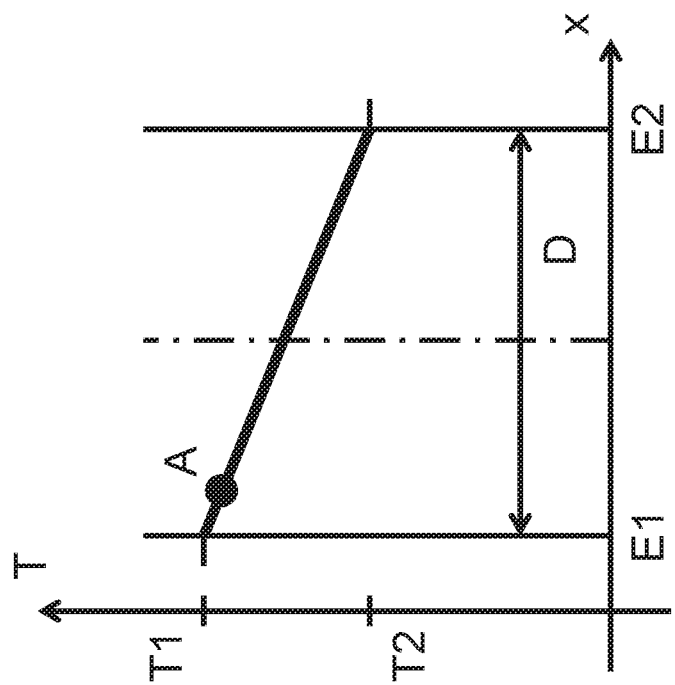
FIG. 4 shows an exemplary (simplified) temperature plot inside the shaft journal in the bearing system of FIG. 2.

As already explained with the help of FIG. 4, a journal portion of a rotating shaft located inside a fluid bearing is subject to non-uniform heating; the journal portion is a portion of the shaft facing the pad or pads fluid bearing; in other words, some parts, i.e. first parts, of the journal portion heat more than other (different) parts, i.e. second parts, of the journal portion; therefore, during rotation, the first parts reach certain temperatures and the second parts reach lower temperatures. Such heat develops in the fluid of the bearing (a lubricant fluid LF) in the gap between the journal portion (211 in FIGS. 2 and 611 in FIG. 6) of the shaft and, usually, pads (221 in FIGS. 2 and 621 in FIG. 6) of the bearing.

A first way to reduce non-uniformity is to reduce the transfer of heat from the hot fluid of the bearing (a lubricant fluid LF) to the journal portion.

A second way to reduce non-uniformity is to remove heat from the first parts of the journal portion and to provide the removed heat somewhere else. In particular, a way to reduce non-uniformity is to remove heat from the first parts of the journal portion and to provide the removed heat to the second (different) parts of the journal portion. Accordingly, heat is transferred from the first parts of the journal portion.

Figure 6:
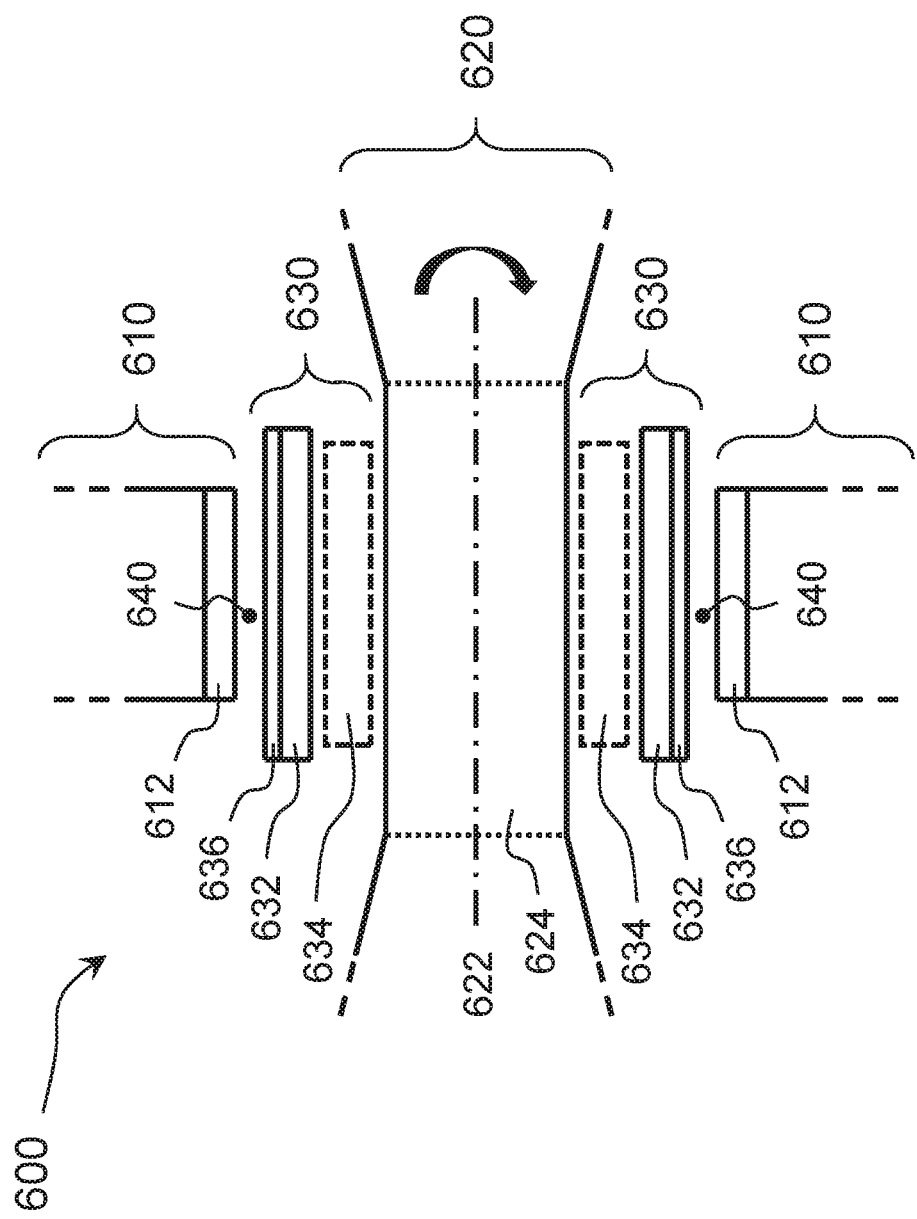
FIG. 6 shows a concept of a bearing system.

With reference to FIG. 6, a method of uniforming temperature in a shaft 620 rotatably supported by a fluid bearing 610 during rotation of the shaft 620 about an axis 622 is based on a rotary bush 630; the bush 630 comprises a hollow cylindrical portion 632 and a plurality of supporting elements 634 that fix the (rotary) hollow cylindrical portion 632 of the bush 630 to a (rotary) solid cylindrical portion 624 of the shaft 620; the solid cylindrical portion 624 of the shaft 620 is in front of pad or pads 612 of the fluid bearing 610; a gap 640 is between the hollow cylindrical portion 632 and the pad or pads 612. In FIG. 6, the bearing system, as a whole, is labelled 600. In FIG. 6, the plurality of supporting elements are shown schematically as a single box (in dashed line) and labelled 634.

It is to be noted that, alternatively to cylindrical, the solid portion of the shaft may be for example slightly conical for the whole length, or cylindrical on one side and slightly conical on the other side, or slightly conical on first and second sides and cylindrical in the middle.

It is to be noted that, alternatively to cylindrical, the hollow portion of the bush may be for example slightly conical for the whole length, or cylindrical on one side and slightly conical on the other side, or slightly conical on first and second sides and cylindrical in the middle.

The hollow cylindrical portion 632 provides thermal insulation between the hot lubricant fluid LF in the gap 640 and the rotating solid cylindrical portion 624 of the shaft 620.

Inside the hollow cylindrical portion 632 a fluid, e.g. a lubricant fluid LF or a heat-exchange fluid HEF, may flow; such flow of fluid allows to transfer heat from parts of the region of the solid cylindrical portion 624 subject to high heating to other parts of the region of the solid cylindrical portion 624 subject to low heating.

In this way, a uniform temperature may be achieved at least in a radially peripheral region of the solid cylindrical portion 624.

The hollow cylindrical portion 632 in the embodiment of FIG. 6 is entirely covered by a layer 636 of thermally insulating material. Alternatively, this portion may be made of thermally insulating material. In this way, heat is hindered from flowing in the radial direction toward the axis 622.

The hollow cylindrical portion 632 in the embodiment of FIG. 6 is entirely covered by a layer 636 having an outer surface with protrusions and/or recesses (in an embodiment having a height/depth in the range of from 0.01 mm to 0.1 mm). Alternatively, this portion may have an outer surface with protrusions and/or recesses (more particularly having a height/depth in the range of from 0.01 mm to 0.1 mm). In this way, this portion may also be used for guiding a lubricant fluid of the fluid bearing. For example, such protrusions and/or recesses may be herringbone-shaped. It is to be noted that protrusions and/or recesses may be on the outer surface of the hollow cylindrical portion 632 or its covering layer 636 and/or on the inner surface of the bearing pad 612.

The hollow cylindrical portion 632 may be made of steel, may have a width of 10-50 mm (its external diameter may be 10-15% bigger than its internal diameter), may have a length of 0.4-1.0 times the diameter of the bearing pad or the shaft journal portion. It may be shrink fit on the shaft at the journal portion.

The layer 636 may be made of thermally insulating material, in particular PEEK (=Poly Ether Ether Ketone) or PTFE (=Poly Tetra Fluoro Ethylene), may have a width of 0.1-1.0 mm, may have a length of 0.4-1.0 times the diameter of the bearing pad or the journal portion. It may be applied (for example deposited) on the sleeve before mounting the sleeve on the shaft.

In the embodiment of FIG. 6, a lubricant fluid flows in the gap 640 between the pad 612 and the layer 636 of the portion 632 so to avoid contact and reduce friction.

Eight embodiments will be described in the following; they differ as far as their bushes regard and as far as their flows of lubricant fluid and/or a heat-exchange fluid regard.

It is to be noted that other embodiments fall within the scope of embodiments of the present invention.

In the bearing systems 700, 800, 900, 1000 of FIGS. 7-10, there is a first set of supporting elements 734A, 834A, 934A, 1034A located at a first end of a hollow cylindrical portion 732, 832, 932, 1032 and a second set of supporting elements 734B, 834B, 934B, 1034B located at a second end of the hollow cylindrical portion 732, 832, 932, 1032; in this way, an annular chamber 738, 838, 938, 1038 is defined between the hollow cylindrical portion 732, 832, 932, 1032 of the bush and the solid cylindrical portion 624 of the shaft 620.

Alternatively, one or more of the supporting elements may be located not at an end of the hollow portion, but, for example, at a position being at a distance from the end.

The bearing systems 1500 and 1600 of FIGS. 15 and 16 are similar to the bearing system of FIG. 9, but achieve an additional technical effect and will be described later in the present description.

The bearing systems 1700 and 1800 of FIGS. 17 and 18 are similar to the bearing system of FIG. 9, but achieve an additional technical effect and will be described later in the present description.

In the supporting elements 734A, 734B, 834A, 834B, 934A, 934B, 1034A, 1034B of the first set and of the second set are vanes.

The supporting elements 734A, 734B, 834A, 834B, 934A, 934B, 1034A, 1034B may form a crown around the portion 624 and may be equally spaced between them.

As the supporting elements 734A, 734B, 834A, 834B, 934A, 934B, 1034A, 1034B are spaced between them a fluid may enter and exit the annular chamber 738, 838, 938, 1038. Such fluid may be a lubricant fluid LF or a heat-exchange fluid HEF; if the fluid is selected appropriately, it may act both as lubricant fluid and as heat-exchange fluid.

In the embodiment of FIG. 7, the vanes 734A and 734B are shaped and positioned so to establish flow of a heat-exchange fluid HEF during rotation of the shaft 620 from a first side S2 of the fluid bearing to a second side S1 of the fluid bearing.

In the embodiment of FIG. 8, the vanes 834A and 834B are shaped and positioned so to establish flow of a heat-exchange fluid HEF during rotation of the shaft 620 from the side S1 to the side S2.

More particularly, the vanes 734A, 734B, 834A, 834B are shaped and positioned so to establish a fluid flow with helix-shaped fluid paths inside annular chamber 738, 838 during rotation of the shaft 620 from the side S1 to the side S2.

In the embodiment of FIG. 9, the vanes 934A and 934B are shaped and positioned so to establish fluid flow from an annular chamber 938 to a first side S1 of the fluid bearing and to a second side S2 of the fluid bearing during rotation of the shaft 620. In the embodiment of FIG. 9, this fluid (that acts as a heat-exchange fluid) is the same lubricant fluid LF flowing in the gap 640; the lubricant fluid enters the annular chamber 938 for example through a plurality of holes in the hollow cylindrical portion 932. Alternatively, this fluid may be a fluid different from the lubricant fluid LF flowing in the gap 640.

In the embodiment of FIG. 10, the vanes 1034A and 1034B are shaped and positioned so to establish fluid flow from a first side S1 of the fluid bearing and from a second side S2 of the fluid bearing to an annular chamber 1038 during rotation of the shaft 620. In the embodiment of FIG. 10, this fluid (that acts as a heat-exchange fluid) is the same lubricant fluid LF flowing in the gap 640; the lubricant fluid exits the annular chamber 1038 for example through a plurality of holes in the hollow cylindrical portion 1032. Alternatively, this fluid may be a fluid different from the lubricant fluid LF flowing in the gap 640.

More particularly, the vanes 934A, 934B, 1034A, 1034B are shaped and positioned so to establish two fluid flows with helix-shaped fluid paths inside annular chamber 938, 1038 during rotation of the shaft 620.

In the bearing systems 1100, 1200, 1300, 1400 of FIGS. 11-14, the supporting elements are one or two sets of helix-shaped walls 1134, 1234, 1334A, 1334B, 1434A, 1434B that define helix-shaped passages for flowing a fluid.

Such fluid may be a lubricant fluid LF or a heat-exchange fluid HEF; if the fluid is selected appropriately, it may act both as lubricant fluid and as heat-exchange fluid.

In the bearing systems 1100 and 1200 of FIG. 11 and FIG. 12, the supporting elements are a set of helix-shaped walls 1134 and 1234 that define a plurality of helix-shaped passages 1138 and 1238 extending at least between a first side S1 of the fluid bearing and a second side S2 of the fluid bearing; these passages 1138 and 1238 are arranged for a flow of a heat-exchange fluid HEF from one side of the fluid bearing to the other side of the fluid bearing during rotation of the shaft 620.

In the embodiment of FIG. 11, the walls 1134 are shaped and positioned so to establish flow of a heat-exchange fluid HEF during rotation of the shaft 620 from a first side S2 of the fluid bearing to a second side S1 of the fluid bearing.

In the embodiment of FIG. 12, the walls 1234 are shaped and positioned so to establish flow of a heat-exchange fluid HEF during rotation of the shaft 620 from the side S1 to the side S2.

In the bearing systems 1300 and 1400 of FIG. 13 and FIG. 14, the supporting elements are a first set of helix-shaped walls 1334A and 1434A that define a first plurality of helix-shaped passages extending at least between a central zone 1338 and 1438 of the fluid bearing and a first side S1 of the fluid bearing, and a second set of helix-shaped walls 1334B and 1434B that define a second plurality of helix-shaped passages extending at least between the central zone 1338 and 1438 of the fluid bearing and a second side S2 of the fluid bearing; the passages being arranged for a flow of a fluid between the central zone 1338 and 1438 of the fluid bearing to the sides S1 and S2 of the fluid bearing.

In the embodiments of FIG. 13 and FIG. 14, this fluid (that acts as a heat-exchange fluid) is the same lubricant fluid LF flowing in the gap 640.

In the embodiment of FIG. 13, the fluid flows from the central zone 1338 of the fluid bearing to the first side S1 of the fluid bearing and to the second side S2 of the fluid bearing during rotation of the shaft 620.

In the embodiment of FIG. 14, the fluid flows from the first side S1 of the fluid bearing and from the second side S2 of the fluid bearing to the central zone 1438 of the fluid bearing during rotation of the shaft 620.

In the bearing systems 1300 and 1400 of FIG. 13 and FIG. 14, an annular chamber is defined between the hollow cylindrical portion 1332 and 1432 of the bush and the solid cylindrical portion 624 of the shaft 620, and comprises a first side portion (wherein the walls 1334A and 1434A are located), a second side portion (wherein the walls 1334B and 1434B are located) and a central portion 1338 and 1438.

Each of the above-mentioned passage may comprises a number of turns about the axis 622 of the shaft 620; the number of turns may be in the range from 0.1 to 10.0, in an embodiment from 0.25 to 4.0, more particularly from 0.5 to 2.0.

A pitch of each of the above-mentioned passage may be equal to a number of times the axial length of the fluid bearing; the number of times may be in the range from 10.0 to 0.1, in an embodiment from 4.0 to 0.25, more particularly from 2.0 to 0.5. In the embodiments if FIGS. 6-14, the axial length of the fluid bearing may be considered the length of the pad or pads 612 or the length of the hollow cylindrical portion 632.

It is to be noted that the rotation of the shaft 620 pumps fluid along the annular chamber defined between and the hollow cylindrical portion 632 of the bush 630 to the solid cylindrical portion 624 of the shaft 620.

In the bearing systems 1500 and 1600 of FIGS. 15 and 16, there is a first set of supporting elements 1534A and 1634A located at a first end of a hollow cylindrical portion 1532 and 1632 and a second set of supporting elements 1534B and 1634B located at a second end of the hollow cylindrical portion 1532 and 1632 (supporting elements 1634B may be a single piece); in this way, an annular chamber 1538 and 1638 is defined between the hollow cylindrical portion 1532, 1632 of the bush and the solid cylindrical portion 624 of the shaft 620.

In the supporting elements 1534A, 1534B, 1634A are vanes.

The supporting elements 1534A, 1534B, 1634A may form a crown around the portion 624 and may be equally spaced between them.

As the supporting elements 1534A, 1534B, 1634A are spaced between them a fluid may exit the annular chamber 1538 and 1638. Typically, when the shaft 620 does not rotate the annular chamber 1538 and 1638 is full of lubricant fluid LF, when the shaft 620 starts rotating a lubricant fluid flow establishes and lubricant fluid LF starts exiting the annular chamber 1538 and 1638, when the shaft 620 rotates the annular chamber 1538 and 1638 is totally or partially empty of lubricant fluid LF ("empty" includes the possibility that the pressure of lubricant fluid LF inside the annular chamber 1538 and 1638 is lower than outside the annular chamber 1538 and 1638). In this way, a technical effect of isolating the hot lubricant fluid LF in the gap of the bearing system 1500 and 1600, and the cylindrical portion 624 of the shaft 620 is achieved.

In the embodiment of FIG. 15, the vanes 1534A and 1534B are shaped and positioned so to establish fluid flow from an annular chamber 1538 to a first side S1 of the fluid bearing and to a second side S2 of the fluid bearing.

In the embodiment of FIG. 16, the vanes 1634A and the supporting element or elements 1634B are shaped and positioned so to establish fluid flow from an annular chamber 1638 to only one side of the fluid bearing, in particular to a first side S1 of the fluid bearing.

A technical effect similar to one in the embodiments of FIGS. 15 and 16, may be achieved also when helix-shaped passages are used.

Considering FIG. 11 or 12, the bearing system may be arranged so that the helix-shaped passages are totally or partially empty during rotation of the shaft.

Considering FIG. 13, the bearing system may be arranged so that the helix-shaped passages of the first and second sets are empty during rotation of the shaft.

In the bearing systems 1700 and 1800 of FIGS. 17 and 18, there is a first set of supporting elements 1734A and 1834A located at a first end of a hollow cylindrical portion 1732 and 1832 and a second set of supporting elements 1734B and 1834B located at a second end of the hollow cylindrical portion 1732 and 1832 (supporting elements 1834B may be a single piece); in this way, an annular chamber 1738 and 1838 is defined between the hollow cylindrical portion 1732, 1832 of the bush and the solid cylindrical portion 624 of the shaft 620.

In the supporting elements 1734A, 1734B, 1834A are vanes.

The supporting elements 1734A, 1734B, 1834A may form a crown around the portion 624 and may be equally spaced between them.

As the supporting elements 1734A, 1734B, 1834A are spaced between them a fluid may enter the annular chamber 1738 and 1838. Typically, when the shaft 620 does not rotate the annular chamber 1738 and 1838 is partially full of lubricant fluid LF, when the shaft 620 starts rotating a lubricant fluid flow establishes and lubricant fluid LF starts entering the annular chamber 1738 and 1838, when the shaft 620 rotates the annular chamber 1738 and 1838 is totally full of lubricant fluid LF ("totally full" includes the possibility that the pressure of lubricant fluid LF inside the annular chamber 1738 and 1838 is higher than outside the annular chamber 1738 and 1838). In this way, a technical effect of isolating the hot lubricant fluid LF in the gap of the bearing system 1700 and 1800, and the cylindrical portion 624 of the shaft 620 is achieved. Furthermore, the fluid inside the annular chamber 1738 and 1838 may flow around the shaft 620 thus uniforming temperature in the shaft 620.

In the embodiment of FIG. 17, the vanes 1734A and 1734B are shaped and positioned so to establish fluid flow from a first side S1 of the fluid bearing and from a second side S2 of the fluid bearing to an annular chamber 1738.

In the embodiment of FIG. 18, the vanes 1834A and the supporting element or elements 1834B are shaped and positioned so to establish fluid flow from only one side of the fluid bearing, in particular to a first side S1 of the fluid bearing, to an annular chamber 1838.

A technical effect similar to one in the embodiments of FIGS. 17 and 18, may be achieved also when helix-shaped passages are used.

Considering FIG. 11 or 12, the bearing system may be arranged so that the helix-shaped passages are totally full during rotation of the shaft.

Considering FIG. 14, the bearing system may be arranged so that the helix-shaped passages of the first and second sets are totally full during rotation of the shaft.

Figure 1:
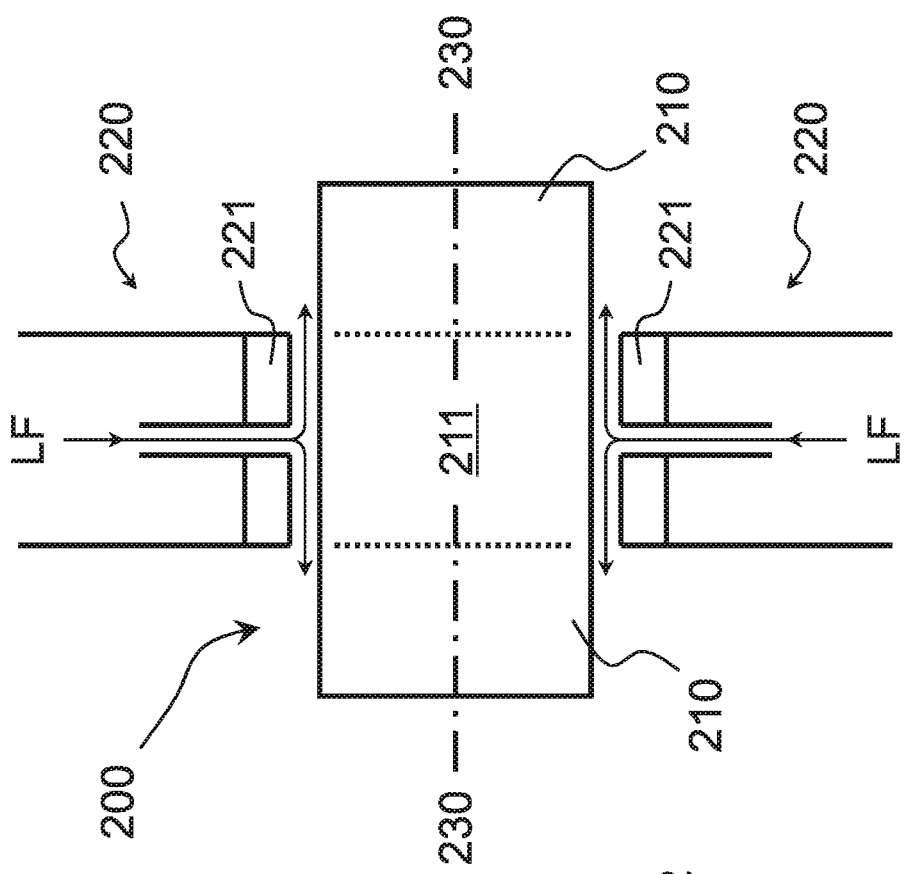
FIG. 1 shows schematically a turbomachine with bearing systems.

A bearing system as described above or similar thereto may be advantageously be used in a turbomachine, like for example the one shown in FIG. 1.

It is to be noted that, in the field of "Oil & Gas", i.e. machines used in plants for exploration, production, storage, refinement and distribution of oil and/or gas, there is a particularly high need for turbomachines avoiding non-uniform temperature distribution inside a shaft journal supported by a fluid bearing, or at least reducing non-uniformity considerably, and therefore using such bearing system.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A bearing system comprising:
   a fluid bearing;
   a shaft with a solid portion;
   a bush located around said solid portion and in front of a pad or pads of the fluid bearing, wherein the bush comprises a hollow portion and a plurality of supporting elements that fix the hollow portion of the bush to the solid portion of the shaft;
   a first set of supporting elements located at a first position of the hollow portion and a second set of supporting elements located at a second position of the hollow portion;
   an annular chamber defined between the hollow portion of the bush to the solid portion of the shaft,
   wherein the supporting elements of the first set and/or of the second set are vanes wherein a lubricant fluid or a heat-exchange fluid flows into or out of said annular chamber.

2. The bearing system of claim 1, wherein the vanes are shaped and positioned so to establish flow of a heat-exchange fluid during rotation of the shaft from a first side of the fluid bearing to a second side of the fluid bearing.

3. The bearing system of claim 1, wherein the vanes are shaped and positioned so to establish flow of a lubricant fluid or a heat-exchange fluid during rotation of the shaft from the annular chamber to a first side of the fluid bearing and to a second side of the fluid bearing.

4. The bearing system of claim 3, wherein the annular chamber is empty of lubricant fluid during rotation of the shaft.

5. The bearing system of claim 3, wherein the lubricant fluid enters into the annular chamber from a gap between the bush and the pad or pads passing through the hollow portion.

6. The bearing system of claim 1, wherein the vanes are shaped and positioned so to establish flow of a lubricant fluid or a heat-exchange fluid during rotation of the shaft from a first side of the fluid bearing and/or from a second side of the fluid bearing to the annular chamber.

7. The bearing system of claim 6, wherein the annular chamber is full of lubricant fluid during rotation of the shaft.

8. The bearing system of claim 6, wherein the lubricant fluid exits from the annular chamber into a gap between the bush and the pad or pads passing through the hollow portion.

9. A turbomachine comprising at least one bearing system according to claim 1.

* * * * *